United States Patent [19]
Yoshida et al.

[11] Patent Number: 5,987,524
[45] Date of Patent: Nov. 16, 1999

[54] LOCAL AREA NETWORK SYSTEM AND ROUTER UNIT

[75] Inventors: Akiko Yoshida; Takaya Yamamoto, both of Kawasaki, Japan

[73] Assignee: Fujitsu Limited, Kanagawa, Japan

[21] Appl. No.: 08/940,149

[22] Filed: Sep. 30, 1997

[30] Foreign Application Priority Data

Apr. 17, 1997 [JP] Japan .................................. 9-100017

[51] Int. Cl.⁶ ............................ G06F 13/38; G06F 15/17
[52] U.S. Cl. ........................................ 709/245; 709/238
[58] Field of Search .............................. 348/12; 370/401, 370/402, 475; 395/200.68, 200.75, 200.76, 200.79, 200.82; 709/238, 245, 246, 249, 252

[56] References Cited

U.S. PATENT DOCUMENTS

| | | | |
|---|---|---|---|
| 5,485,455 | 1/1996 | Dobbins et al. | 370/60 |
| 5,491,694 | 2/1996 | Oliver et al. | 370/85.4 |
| 5,521,910 | 5/1996 | Matthews | 370/54 |
| 5,636,216 | 6/1997 | Fox et al. | 370/402 |
| 5,708,654 | 1/1998 | Arndt et al. | 370/242 |
| 5,724,510 | 3/1998 | Arndt et al. | 395/200 |
| 5,790,806 | 8/1998 | Koperda | 395/200.82 |

FOREIGN PATENT DOCUMENTS 3-258141  11/1991  Japan .
5-22296   1/1993   Japan .

Primary Examiner—Mark H. Rinehart
Attorney, Agent, or Firm—Helfgott & Karas, P C.

[57] ABSTRACT

A local area network system which allows a plurality of subscriber terminals to communicate with each other via a central station, and a router unit therefor. Logical addresses assigned to the individual subscriber terminals and physical addresses associated therewith are previously registered to an address table. The central station receives transmission data from a first subscriber terminal, to which data a logical address of a second subscriber terminal is affixed. A physical address reading unit, as part of the central station, reads out a physical address corresponding to the received logical address by consulting the address table. When the received logical address was incorrect, the physical address reading unit cannot find the corresponding entry in the address table, and if that is the case, the received transmission data will be discarded. When the received logical address was found in the address table, the data transfer unit forwards the transmission data to the second subscriber terminal by using the logical address affixed to the received transmission data and the physical address that is read out by the physical address reading unit.

13 Claims, 10 Drawing Sheets ma : ipa
mb : ipb
．
．
．
mn : ipn

FIG. 3

LOCAL AREA NETWORK SYSTEM AND ROUTER UNIT

BACKGROUND OF THE INVENTION

1. Field of the Invention

The present invention relates to a local area network (LAN) system and a router unit used in a LAN system, and more particularly, to a LAN system interconnecting a central station and a plurality of subscriber terminals via a network, and also to a router unit used therein, to provide data communications services between the plurality of subscriber terminals via the central station by using logical and physical addresses assigned thereto, in addition to analog information delivery services from the central station to the plurality of subscriber terminals.

2. Description of the Related Art

In recent years, CATV-based local area network systems (CATV-LAN) are expected to be excellent infrastructures for data communications. To serve this expectation, however, it is necessary to solve some problems with the existing CATV-LAN systems as will be described below, and the present invention is intended to provide appropriate solutions for them.

Conventional CATV networks connect between a central station and a plurality of subscriber terminals to provide a unidirectional communications service for distributing analog information, such as voice and video programs, from the central station to the subscriber terminals. Today's CATV networks is added a backward communication function from the subscriber terminals to the central station, which enables subscriber's realtime participation in TV programs, pay-per-view accounting, and other new services. Most of such CATV networks use coaxial cables as broadband signal transmission media.

On the other hand, the increasing demands for data communications drive the CATV networks to expand their usage to digital data communications. This is an attempt to exploit the above-described excellent features of CATV networks—bidirectional communication capabilities between a central station and subscriber terminals and wide bandwidth provided by the coaxial cable media. More specifically, a CATV network can be used to interconnect many personal computers at the subscribers' sites via a central station, independently of the existing public telephone networks, allowing the subscribers to enjoy data communications services including high-speed access to the Internet.

Such bidirectional data communications services are usually provided in a LAN environment where the Internet Protocol (IP) is used for addressing the members in a network.

In such a LAN data communications environment, different IP addresses have to be properly set to subscriber terminals. However, since this address setting is left to individual subscribers, some subscriber may set up, by mistake, his/her own terminal with the same IP address as that of a terminal of someone else. This causes a collision of IP addresses in a network, which disrupts the operation of the network system.

There may also be a potential problem of illegal use of IP addresses, where some person may maliciously use another person's IP address to make access to the network resources by setting up his/her terminal as the other person's. This problem raises the demands for security systems to protect the network from such malicious person's intrusion into the network. Security issues are really inevitable in order to make the public use of a CATV-based network possible.

Some network protocols such as Dynamic Host Configuration Protocol (DHCP) are introduced recently, which provides automatic set up of IP addresses to prevent the system from address collision. This DHCP, however, does not serve as a protection device against deliberate change of IP addresses. Therefore, it is still impossible to prevent illegal use of other people's IP addresses from happening.

SUMMARY OF THE INVENTION

Taking the above into consideration, an object of the present invention is to provide a LAN system and a router unit which prevent the system from disruption due to a wrong IP address setting and protect the system against any illegal use of IP addresses.

To accomplish the above object, according to the present invention, there is provided a LAN system including a central station and a plurality of subscriber terminals interconnected via a network, which provides data communications services between the plurality of subscriber terminals via the central station by using logical addresses and physical addresses assigned thereto, as well as analog information delivery services from the central station to the plurality of subscriber terminals, where the plurality of subscriber terminals include a first subscriber terminal with a first logical address and a first physical address and a second subscriber terminal with a second logical address and a second physical address.

This LAN system comprises: (a) a router unit, disposed in the central station, for receiving transmission data from the first subscriber terminal along with the second logical address affixed thereto as a destination logical address, and routing the transmission data to the second subscriber terminal; (b) an address table, disposed in the router unit, for storing the logical addresses assigned to the individual subscriber terminals and the physical addresses associated with the logical addresses; (c) physical address reading means, disposed in the router unit, for reading out the second physical address associated with the second logical address from the address table, upon receipt of the transmission data addressed to the second subscriber terminal; and (d) data transfer means, disposed in the router unit, for forwarding the received transmission data to the second subscriber terminal by using the second logical address affixed to the received transmission data and the second physical address that is read out by the physical address reading means.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 3 is a diagram showing typical contents of an address table;

DESCRIPTION OF THE PREFERRED EMBODIMENTS

Several preferred embodiments of the present invention will be described below with reference to the accompanying drawings.

Figure 1:
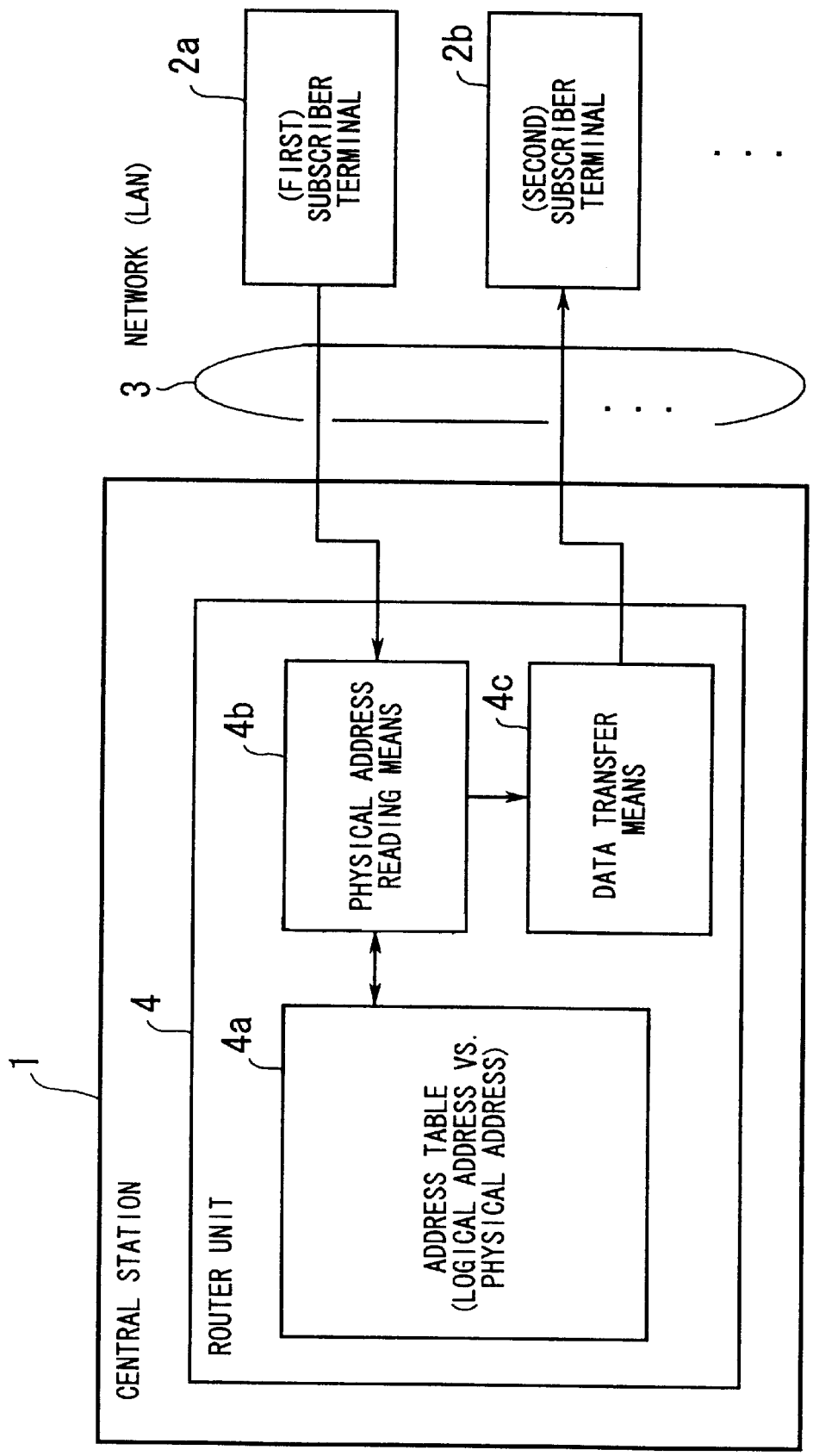
FIG. 1 is a conceptual view of the present invention.

Referring first to FIG. 1, the principle of a first embodiment is explained. FIG. 1 depicts the first embodiment of a LAN system according to the present invention. This LAN system interconnects a central station 1 and a plurality of subscriber terminals 2a, 2b, etc. via a network 3 to provide some prescribed analog information delivery services from the central station 1 to the respective subscriber terminals 2a, 2b, etc. The illustrated LAN system also provides data communications services to allow the subscriber terminals 2a, 2b, etc. to communicate with each other via the central station 1. To make this communication possible, different logical addresses and physical addresses are assigned to the central station 1 as well as to the individual subscriber terminals 2a, 2b, etc.

The LAN system comprises the following elements: (a) a router unit 4, disposed in the central station 1, for receiving transmission data from the first subscriber terminal 2a along with the second logical address affixed thereto as a destination logical address, and routing the transmission data to the second subscriber terminal 2b; (b) an address table 4a, disposed in the router unit 4, for storing the logical addresses assigned to the individual subscriber terminals 2a, 2b, etc. and the physical addresses associated with the logical addresses; (c) physical address reading means 4b, disposed in the router unit 4, for reading out the second physical address associated with the second logical address from the address table 4a, upon receipt of the transmission data addressed to the second subscriber terminal 2b; and (d) data transfer means 4c, disposed in the router unit 4, for forwarding the received transmission data to the second subscriber terminal 2b by using the second logical address affixed to the received transmission data and the second physical address that is read out by the physical address reading means 4b.

In the above structural arrangement, the address table 4a stores the logical addresses of individual subscriber terminals along with the physical addresses associated therewith, which address information is registered beforehand.

Assume here that a communication session has started between the subscriber terminals 2a, 2b, etc. For instance, the first subscriber terminal 2a has transmitted some data addressed to the second subscriber terminal 2b over the network 3. This transmission data, along with the logical address of the second subscriber terminal 2b, is received by the central station 1.

Upon receipt of the transmission data accompanied by the logical address of the second subscriber terminal 2b, the physical address reading means 4b in the central station 1 reads out a physical address corresponding to the received logical address by consulting the address table 4a. If the received logical address was incorrect, the physical address reading means 4b will not be able to find the corresponding entry in the address table 4a. If that is the case, the received transmission data will be discarded.

When in turn the received logical address is found in the address table 4a as a registered entry, the data transfer means 4c forwards the transmission data to the second subscriber terminal 2b, using the received logical address and the physical address read out by the physical address reading means 4b. Therefore, even if a wrong logical address is set to the transmission data, the LAN system will simply discard such data and continue to provide services without any disruption.

In the proposed LAN system, the logical address and physical address of the first subscriber terminal 2a, or the source subscriber terminal, are also sent to the central station 1 together with the transmission data. The router unit 4 verifies whether the received logical and physical addresses of the first subscriber terminal 2a exist in the address table 4a or not. The router unit 4 discards the transmission data if it failed to verify the received addresses, thereby protecting the system from being used by a person who maliciously attempts to make access thereto by using some other person's IP address.

It should be noted that, in the above description, the term "subscriber terminal" actually refers to two kinds of devices; one is such a device that handles analog signals for video, voice, and other information, and the other is such a device that processes digital signals for digital data communications. In the following section, however, the same term "subscriber terminal" will only refer to a device of the latter kind, i.e., a digital signal processing device for data communications. More particularly, this term will hereafter be used as a synonym of personal computer.

Figure 2:
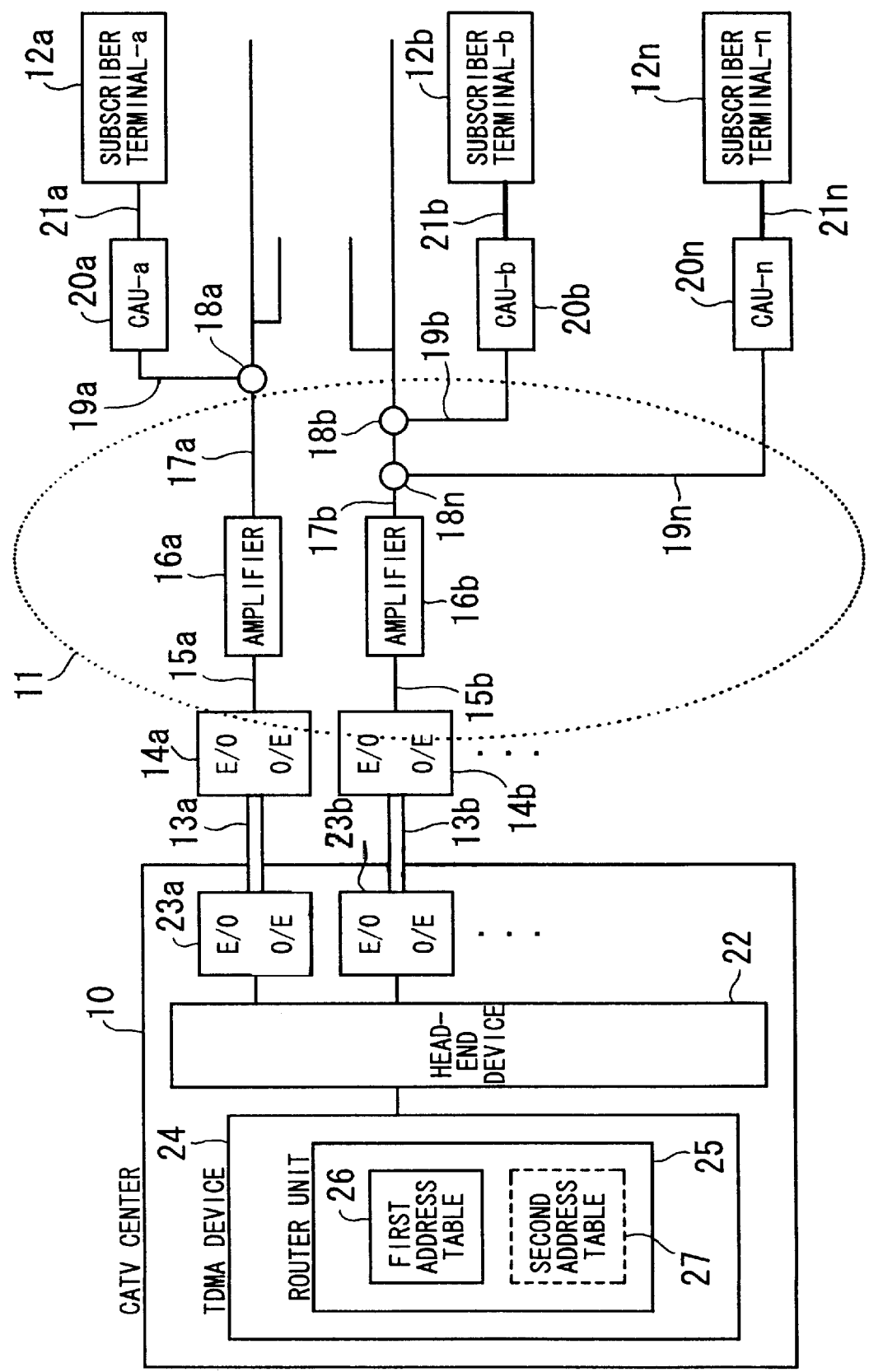
FIG. 2 is a block diagram specifically showing a configuration of a first embodiment.

FIG. 2 is a block diagram specifically showing a configuration of the first embodiment. In this FIG. 2, a CATV center 10, or a central facility for CATV services, is connected to a plurality of subscriber terminals 12a–12n through a CATV network 11. The CATV center 10 and CATV network 11 are wired with optical media. On the other hand, the CATV network 11 and the subscriber terminals 12a–12n are interconnected by electric media, where frequency division multiplexing techniques are used to transmit a plurality of signals at a time. The frequency division multiplexed signals include many video and voice channels and data packet signals that are modulated by using modems.

More specifically, the CATV center 10 is linked to the subscriber terminal 12a via a signal path constructed by an optical fiber cable 13a, electrical-to-optical and optical-to-electrical converters (E/O and O/E) 14a, a coaxial cable 15a, an amplifier 16a, a coaxial cable 17a, a tap-off point 18a, a coaxial cable 19a, a cable modem (CAU) 20a, and a twisted pair cable 21a, in this order. Similarly to this, the CATV center 10 is connected to the subscriber terminal 12b via another signal path constructed by an optical fiber cable 13b, electrical-to-optical and optical-to-electrical converters (E/O and O/E), 14b, a coaxial cable 15b, an amplifier 16b, a coaxial cable 17b, a tap-off point 18b, a coaxial cable 19b, a cable modem (CAU) 20b, and a twisted pair cable 21b, in this order. A link to the subscriber terminal 12n branches off at a tap-off point 18n that is located in the middle of the coaxial cable 17b. This branching signal path is constructed by a coaxial cable 19n, a cable modem (CAU) 20n, and a twisted pair cable 21n. As mentioned above, the subscriber terminals 12a–12n are personal computers. Although not illustrated in FIG. 2, the coaxial cables 19a–19n are extended to audiovisual devices via home terminals for the subscribers to receive video and/or voice programs distributed by the CATV center 10. The cable modems 20a–20n are modulator/demodulator units designed to modulate data signals from subscriber terminals to deliver them to the CATV network 11 and, in turn, to demodulate data signals from the CATV network 11 to supply them to the subscriber terminals.

The CATV center 10 comprises a head-end device 22 and electrical-to-optical and optical-to-electrical converters (E/O and O/E) 23a and 23b for sending and receiving video and voice signals. The CATV center 10 further comprises a time division multiple access (TDMA) device 24 coupled to the head-end device 22. This TDMA device 24 multiplexes a lot of packets consisting of header information and data transmission signals in the time domain. The TDMA device 24 sends the time division multiplexed signal created as such to the head-end device 22 after modulating them with its internal modem functions. The head-end device 22 multiplexes in the frequency domain the modulated time division multiplexed signal and the multi-channel video and voice signals, and it transmits them to the subscribers.

In turn, the signals originating in the subscriber terminals are delivered to the TDMA device 24 via the head-end device 22, in the form of modulated time-division multiplex signals. The TDMA device 24 demodulates it and extracts a time division multiplexed signal. Then TDMA device 24 demultiplexes the time division multiplexed signal to obtain separate data packets, as well as extracting header information and transmission data.

The TDMA device 24 comprises a router unit 25 with a first address table 26. This router unit 25 executes routing of transmission data, based on the address information contained in the header of each packet. More specifically, the router unit 25 forwards transmission data sent from a source subscriber terminal to a destination subscriber terminal. The first address table 26 stores IP addresses (or logical addresses) and MAC addresses (or physical addresses) which are assigned to the individual subscriber terminals connected to the CATV network 11. Such address information entries must be manually registered beforehand.

Figure 3:
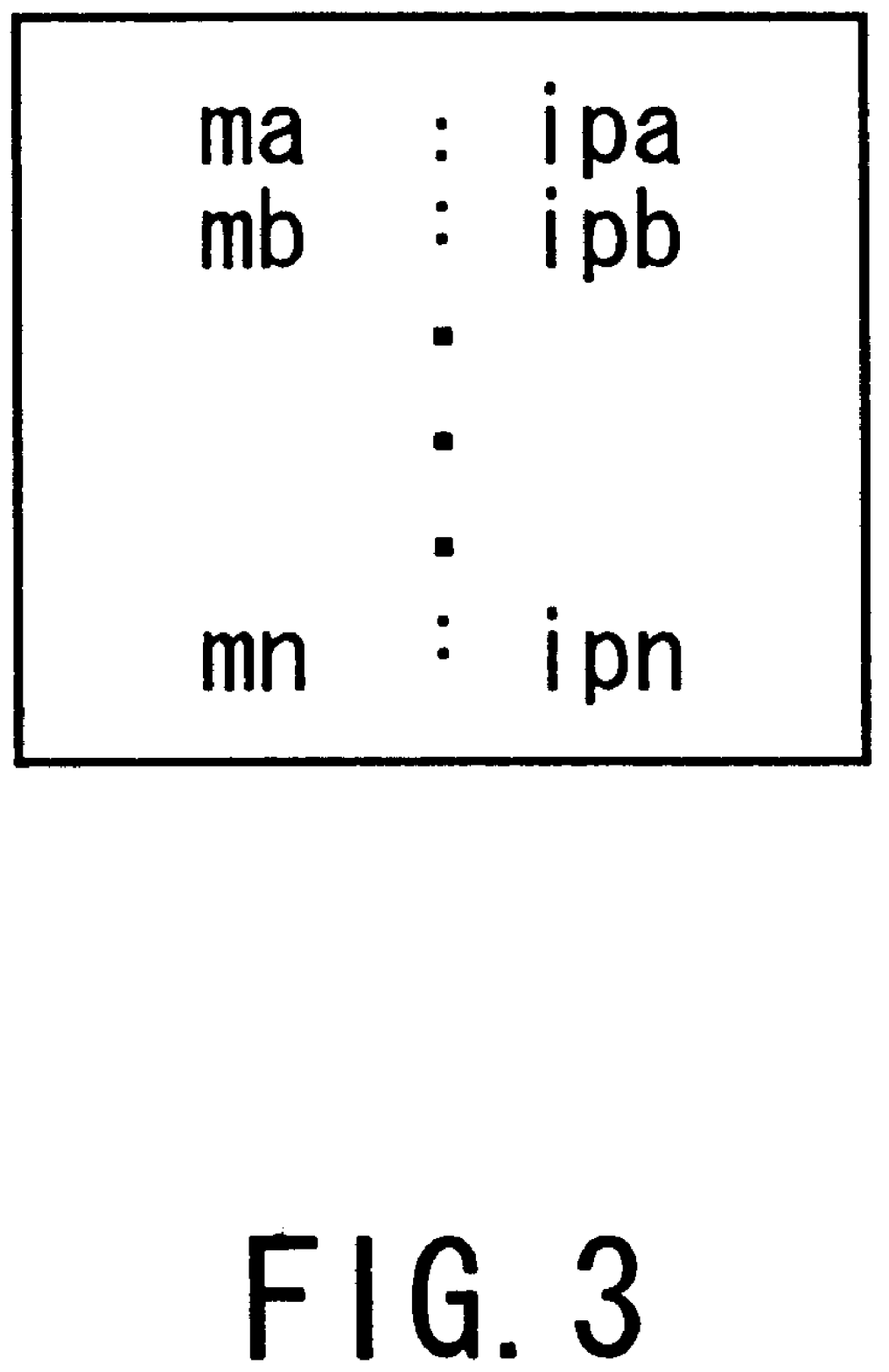

FIG. 3 shows typical contents of the first address table 26, in which the following address pairs are registered for explanatory purposes: IP address ipa and MAC address ma of the subscriber terminal 12a, IP address ipb and MAC address mb of the subscriber terminal 12b, and IP address ipn and MAC address mn of the subscriber terminal 12n. Note that the TDMA device 24 is also assigned an IP address ipr and a MAC address mr, and the first address table 26 has an entry for this address pair, although FIG. 3 does not show it.

The router unit 25 determines whether the packet in process is properly addressed to a regular subscriber terminal or not, based on the IP address and other information included in the header, by consulting the first address table 26. The detailed operation of this router unit 25 will be explained below, with reference to FIG. 4.

Figure 4:
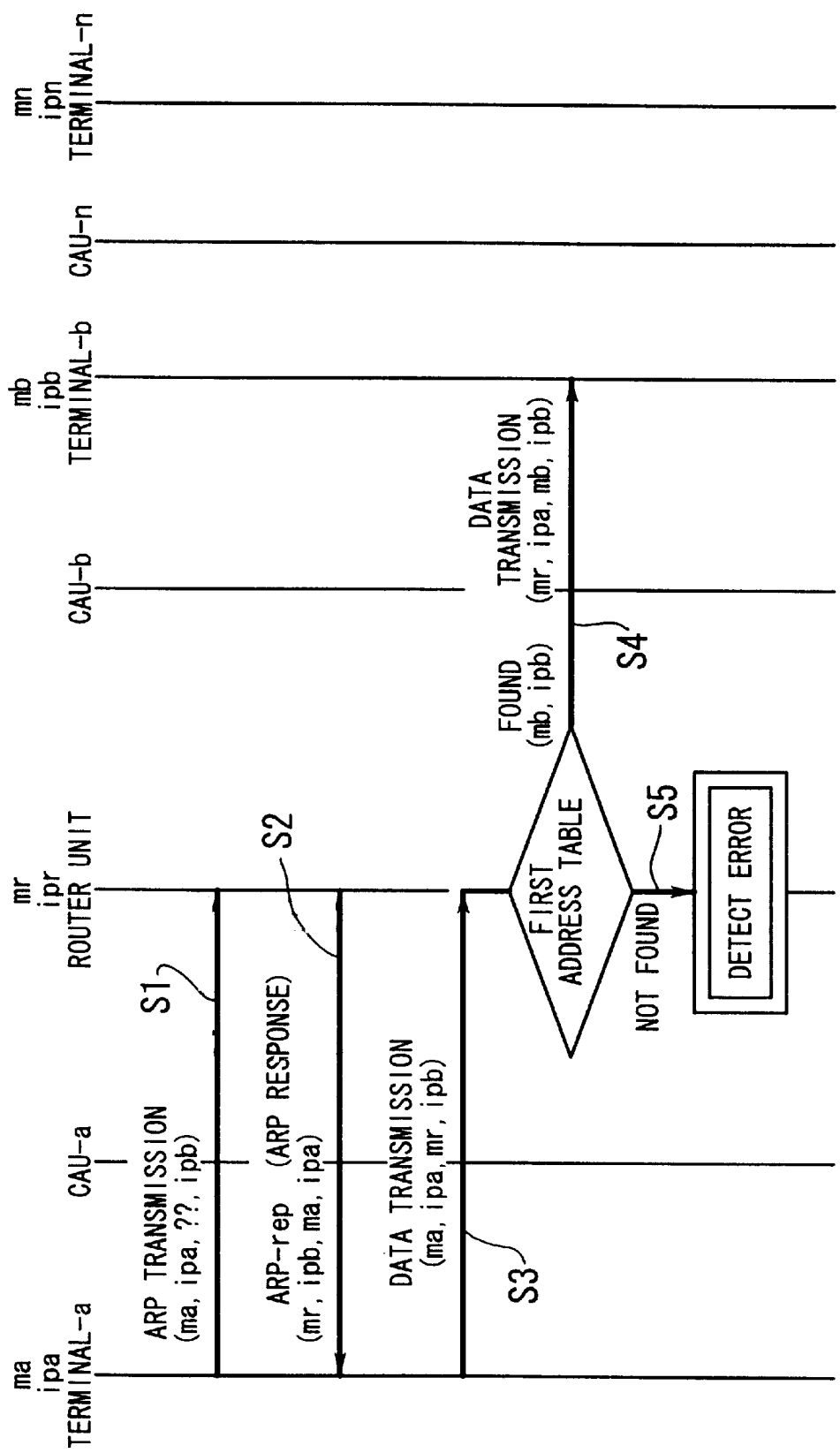
FIG. 4 is a sequence diagram for the first embodiment, which specifically shows data transmission and reception between a router unit and subscriber terminals, as well as explaining the operation of the router unit.

FIG. 4 is a sequence diagram that shows how the router unit 25 interacts with the subscriber terminals, as well as explaining what process is executed in the router unit 25. More specifically, FIG. 4 illustrates a data transfer operation from one subscriber terminal 12a to another subscriber terminal 12b via the router unit 25. The following description will explain the detailed sequence, according to the order of steps shown in FIG. 4.

[S1] When sending a data signal to the subscriber terminal 12b, the subscriber terminal 12a first transmits an ARP request packet to the router unit 25 to get the MAC address of the subscriber terminal 12b, where ARP stands for Address Resolution Protocol. At that time, the subscriber terminal 12a also transmits its own IP address ipa and MAC address ma, and the IP address of the subscriber terminal 12b. Four symbols parenthesized in FIG. 4 show the following address information included in a packet: source MAC address, source IP address, destination MAC address, and destination IP address.

[S2] The router unit 25 returns an ARP response packet to the subscriber terminal 12a to inform it of the MAC address mr of the router unit 25.

[S3] The subscriber terminal 12a sends a data packet containing transmission data to the router unit 25, to which packet the destination MAC address mr and the destination IP address ipb are also affixed.

[S4] The router unit 25 searches the first address table 26 for an entry corresponding to the destination IP address ipb affixed to the data packet. If such an entry that contains the destination IP address ipb and MAC address mb associated therewith is found in the first address table 26, it means that the destination subscriber terminal 12b is verified as a regular subscriber terminal, namely, an authorized member of the LAN system. If that is the case, the router unit 25 assembles a data packet by affixing the source MAC address mr, source IP address ipa, destination MAC address mb, and destination IP ipb to the original transmission data. Then it transmits the assembled data packet to the subscriber terminal 12b, thus allowing the transmission data sent from the source subscriber terminal 12a to be delivered to the destination subscriber terminal 12b.

[S5] If no entry corresponding to the destination IP address ipb is found in the first address table 26, the router unit 25 determines the destination as being a non-registered terminal, and accordingly discards the data packet.

In the way described in steps S1 to S5, the present invention protects the LAN system from disruption due to a collision of IP addresses caused by incorrect address setting at a subscriber's site.

Figure 5:
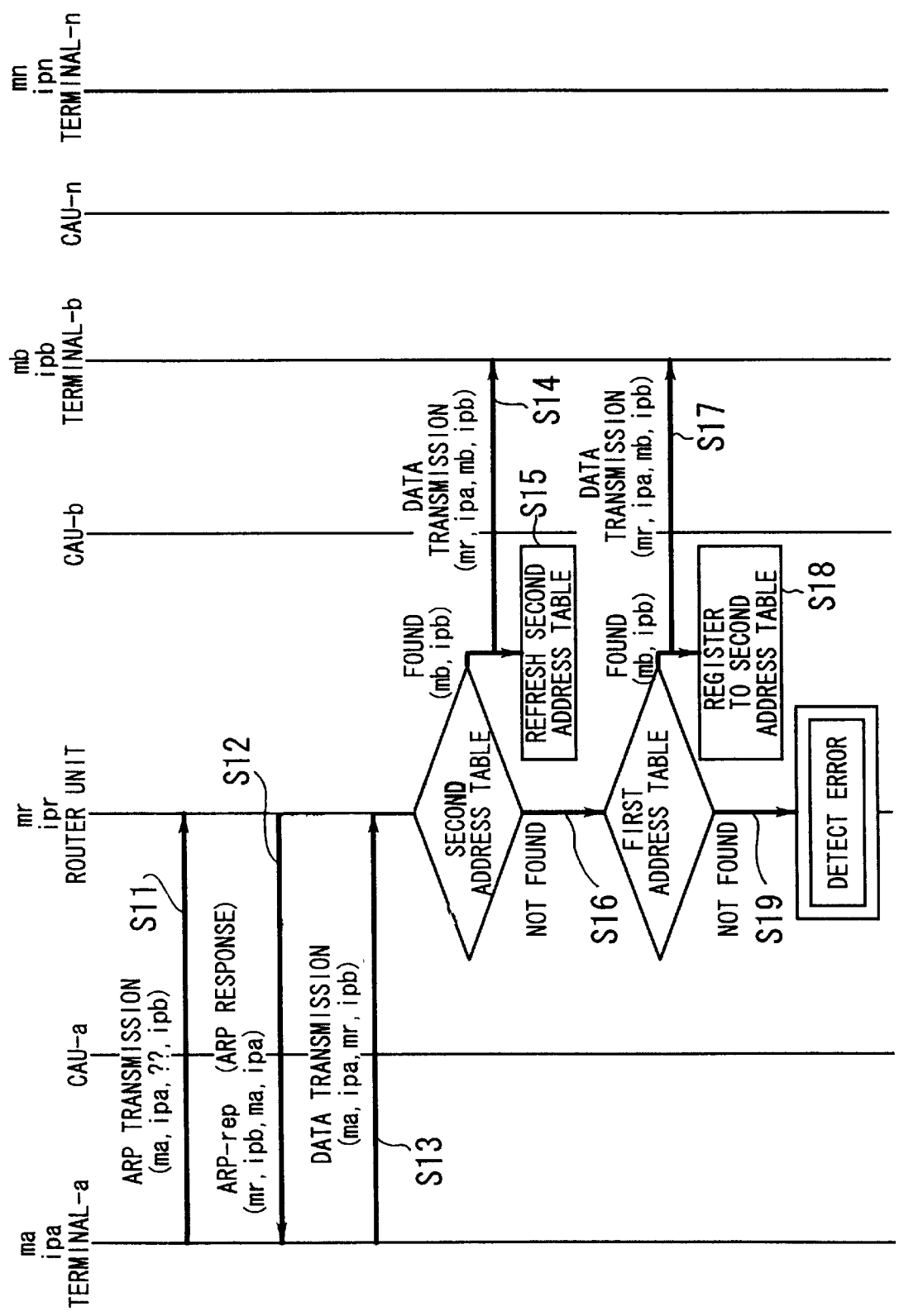
FIG. 5 is a sequence diagram for a second embodiment, which specifically shows data transmission and reception between a router unit and subscriber terminals, as well as explaining the operation of the router unit.

Referring next to FIG. 5, a second embodiment is explained as follows. This second embodiment has basically the same structural arrangement as that of the first embodiment. The following description will explain the second embodiment, assuming the same system configuration as that of the first embodiment.

The second embodiment, however, differs from the first embodiment in that it further comprises a second address table 27, in addition to the first address table 26 as part of the router unit 25 illustrated in FIG. 2. This second address table 27 stores information on the relationship between the IP addresses (or logical addresses) of individual subscriber terminals connected to the CATV network 11 and the MAC addresses (or physical addresses) associated with them, as the first address table 26 does. The second address table 27 is different from the first address table 26 in that it automatically deletes a particular entry if that entry is not refreshed within a prescribed period of time. In this aspect, the router unit 25 of the second embodiment operates differently from the first embodiment, in terms of how it interacts with subscriber terminals and what process is executed internally.

FIG. 5 is a sequence diagram for the second embodiment, which specifically shows how the router unit 25 interacts with subscriber terminals, as well as explaining what process is executed in the router unit 25. Note here that FIG. 5 assumes that one subscriber terminal 12a is attempting a data transfer to another subscriber terminal 12b via the router unit 25. The following description will explain the detailed sequence, according to the order of steps shown in FIG. 5. [S11 to S13] Since steps S11 to S13 are just the same as steps S1 to S3 explained in FIG. 4, the present description skips over these steps.

[S14] The router unit 25 searches the second address table 27 for an entry corresponding to the destination IP address ipb added to the data packet. If such an entry that contains the destination IP address ipb and MAC address mb is found in the second address table 27, it indicates that the destination subscriber terminal 12b is verified as a regular subscriber terminal. If that is the case, the router unit 25 creates a data packet by affixing the source MAC address mr, source IP address ipa, destination MAC address mb, and destination IP ipb to the transmission data received from the subscriber terminal 12a. Then it transmits the data packet to the subscriber terminal 12b, thus allowing the transmission data from the source subscriber terminal 12a to be delivered to the destination subscriber terminal 12b.

[S15] The router unit 25 refreshes the second address table 27 by overwriting the MAC address mb and IP address ipb registered therein, when the destination subscriber terminal 12b is verified as a regular subscriber terminal.

[S16] If the destination IP address ipb was not found in the second address table 27, the router unit 25 then searches the first address table 26 for an entry corresponding to the destination IP address ipb.

[S17] If an entry that contains the destination IP address ipb and MAC address mb associated therewith is found in the first address table 26, the router unit 25 recognizes the destination subscriber terminal 12b as a regular subscriber terminal. If that is the case, the router unit 25 assembles a data packet by affixing the source MAC address mr, source IP address ipa, destination MAC address mb, and destination IP ipb to the transmission data, and then transmits the assembled data packet to the subscriber terminal 12b.

[S18] Now that the subscriber terminal 12b is verified as a regular subscriber terminal, the MAC address mb and IP address ipb are registered to the second address table 27 as a new entry.

[S19] If the destination IP address ipb is not registered in the first address table 26, the router unit 25 detects it as being invalid and discards the data packet received from the source subscriber terminal 12a.

In the way described above, the second embodiment allows the IP addresses and MAC addresses of particular subscriber terminals that exhibit a high usage rate to be registered into the second address table 27. Naturally, the IP and MAC address pairs stored in the second address table 27 are fewer than those stored in the first address table 26. Recall that the router unit 25 refers to the second address table 27 every time a packet arrives from subscriber terminals. The second embodiment reduces the number of address table entries to be scanned, and thus permits the router unit 25 to finish the search in a shorter time and with a smaller processing load.

Figure 6:
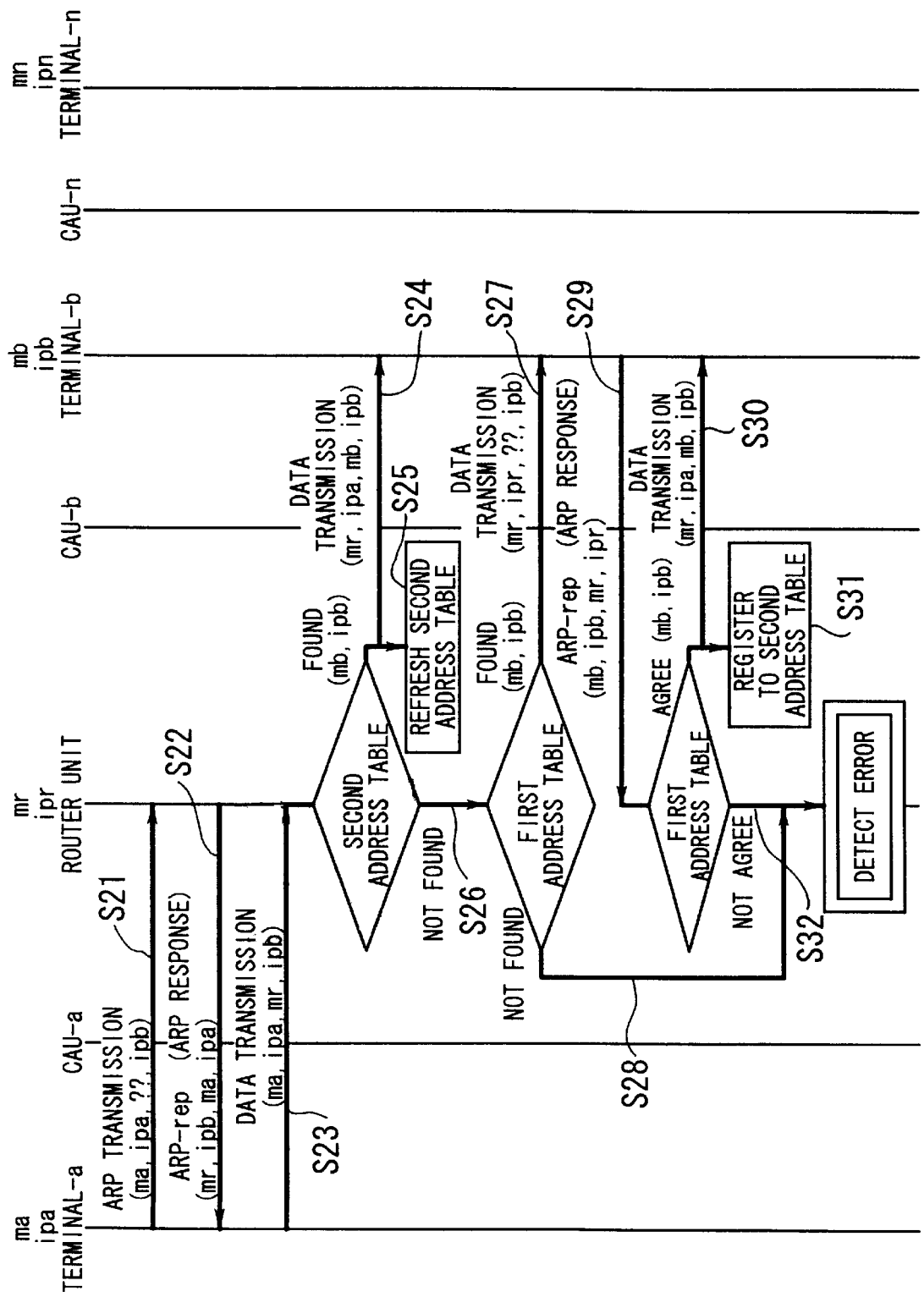
FIG. 6 is a sequence diagram for a third embodiment, which specifically shows data transmission and reception between a router unit and subscriber terminals, as well as explaining the operation of the router unit.

Referring next to FIG. 6, a third embodiment will be explained below. Since this third embodiment has basically the same structural arrangement as that of the second embodiment, the following will describe the third embodiment while partially using the foregoing explanation of the second embodiment.

The third embodiment, however, differs from the second embodiment in the way of interaction between the router unit 25 and subscriber terminals, and also in the process executed inside the router unit 25. FIG. 6 is a sequence diagram that specifically shows this difference from the second embodiment. Note here that FIG. 6 assumes that one subscriber terminal 12a is attempting a data transfer to another subscriber terminal 12b via the router unit 25. The following description will focus on the details of this sequence, according to the order of steps shown in FIG. 6.

S[21 to S26] Since steps S21 to S26 are just the same as steps S11 to S16 described in FIG. 5, the present description skips over these steps.

[S27] The router unit 25 searches the first address table 26 for a MAC address mb associated with the destination IP address ipb. If the MAC address mb is found in the first address table 26 as a registered entry corresponding to the IP address ipb, then the router unit 25 attempts to make a verification of this entry by sending an ARP request packet to the subscriber terminal with the IP address ipb to inquire its MAC address. [S28] If the first address table 26 has no entry relevant to the destination IP address ipb, the router unit 25 recognizes the IP address ipb as being invalid and thus discards the data packet received from the source subscriber terminal 12a.

[S29] The subscriber terminal 12b with the IP address ipb returns an ARP response packet to notify the router unit 25 of its own MAC address mb.

[S30] The router unit 25 examines whether or not the first address table 26 has an entry for the combination of the MAC address mb received from the subscriber terminal 12b and the IP address ipb of the subscriber terminal 12b. If a valid entry for this MAC and IP address combination is found in the first address table 26, the router unit 25 creates a data packet by affixing the source MAC address mr, source IP address ipa, destination MAC address mb, and destination IP ipb to the transmission data, and then transmits it to the subscriber terminal 12b.

[S31] The router unit 25 newly registers the MAC address mb and IP address ipb to the second address table 27, after transmitting the data packet to destination subscriber terminal 12b.

[S32] If the first address table 26 has no entry for the MAC address mb received from the subscriber terminal 12b and the IP address ipb of the subscriber terminal 12b, the router unit 25 recognizes the IP address ipb as being invalid and thus discards the data packet received from the source subscriber terminal 12a.

In the way described above, the router unit 25 of the third embodiment is configured so that it will verify the contents of the first address table 26 by interacting with subscriber terminals specified as destinations.

Figure 7:
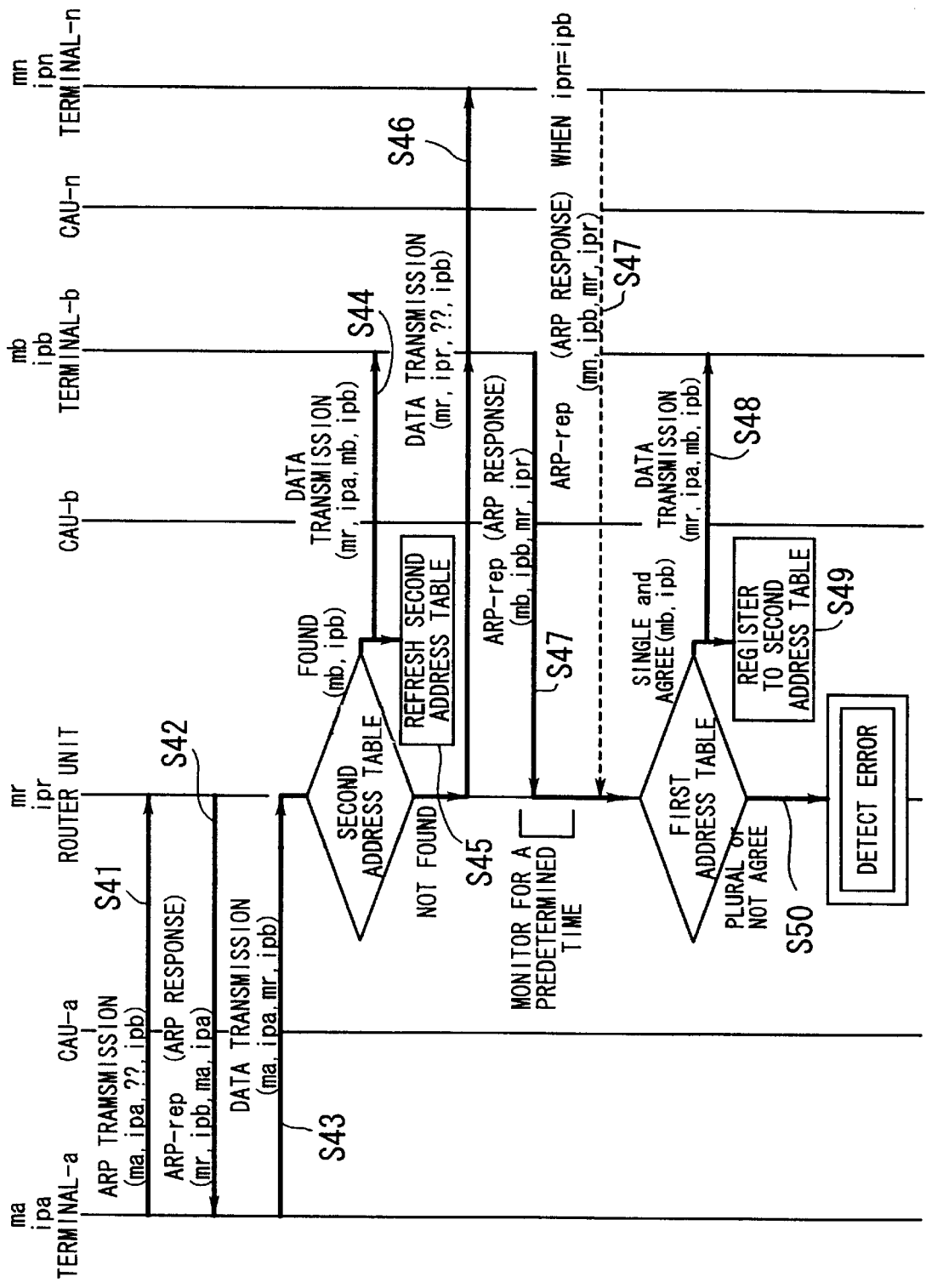
FIG. 7 is a sequence diagram for a fourth embodiment, which specifically shows data transmission and reception between a router unit and subscriber terminals, as well as explaining the operation of the router unit.

Referring next to FIG. 7, the fourth embodiment will be explained below. Since this fourth embodiment has basically the same structural arrangement as that of the third embodiment, the following will describe the fourth embodiment, partially using the foregoing explanation of the third embodiment.

The fourth embodiment, however, differs from the third embodiment in the way of interaction between the router unit 25 and subscriber terminals, and also in the process executed inside the router unit 25. FIG. 7 is a sequence diagram that specifically shows this difference from the third embodiment, in which one subscriber terminal 12a is attempting a data transfer to another subscriber terminal 12b via the router unit 25. Note that the IP address of the subscriber terminal 12n is erroneously set to ipb, which results in a problem situation where two subscriber terminals 12b and 12n are assigned the same IP address. The following description will focus on the detailed sequence, according to the order of steps shown in FIG. 7. [S41 to S45] Since steps S41 to S45 are just the same as steps S21 to S25 described in FIG. 6, the present description skips over these steps. [S46] If the IP address ipb is not registered in the second address table 27, the router unit 25 broadcasts an ARP request packet containing the IP address ipb to all subscriber terminals in order to get the corresponding MAC address.

[S47] Among the subscriber terminals, some subscriber terminals having the IP address ipb solely respond to the APR request packet by returning an ARP response packet indicative of its own MAC address. On the other hand, the router unit 25 waits for responses from subscriber terminals for a predetermined period of time. In the present example shown in FIG. 7, two APR responses return to the router unit 25 since there are two subscriber terminals with the same IP address ipb assigned.

[S48] In the case that only one ARP response packet is received during the predetermined time period, the router unit 25 examines whether or not the first address table 26 has a registered entry for the MAC address mb and destination IP address ipb included in the ARP response packet. If the first address table 26 has the exact entry, the router unit 25 determines the destination subscriber terminal as being a regular member, and the claimed IP address as being correct. The router unit 25 then creates a data packet by affixing the source MAC address mr, source IP address ipa, destination MAC address mb, and destination IP ipb to the transmission data, and transmits it to the subscriber terminal 12b.

[S49] The router unit 25 newly registers the MAC address mb and IP address ipb to the second address table 27, after transmitting the data packet to destination subscriber terminal 12b.

[S50] In the case that two or more ARP response packets are received during the predetermined time period, the router unit 25 recognizes the presence of some setting errors about the IP addresses of subscriber terminals. Even when there was only one ARP response packet returned during the predetermined time period, the MAC address mb and destination IP address ipb included in the packet may not be found in the first address table 26. If that is the case, the router unit 25 also recognizes the presence of some setting errors in the first address table 26. In both cases, the router unit 25 discards the data packet received from the source subscriber terminal 12a.

In the way described above, the router unit 25 of the fourth embodiment deals with the erroneous settings of IP addresses.

Figure 8:
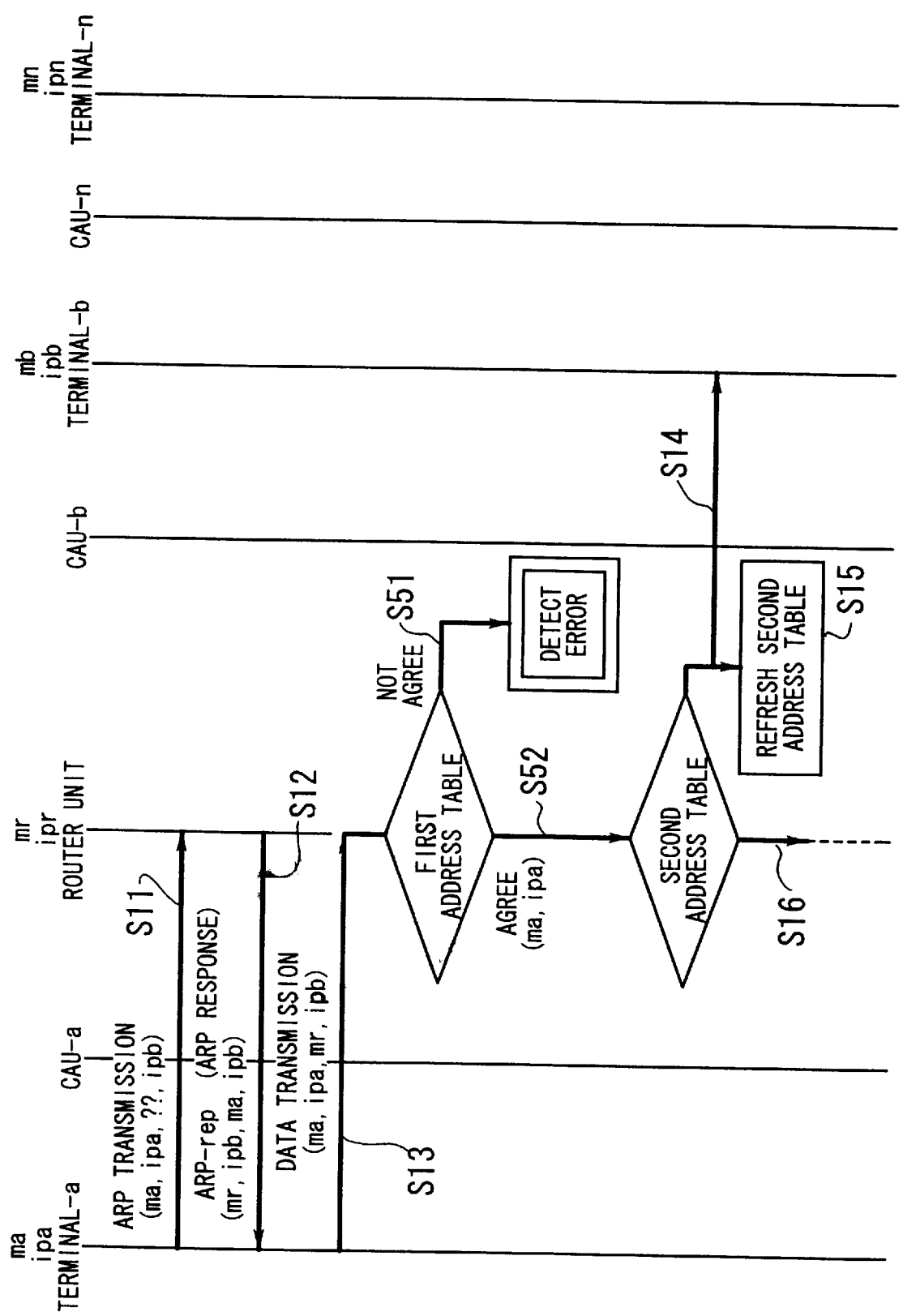
FIG. 8 is a sequence diagram for a fifth embodiment, which specifically shows data transmission and reception between a router unit and subscriber terminals, as well as explaining the operation of the router unit.

Referring next to FIG. 8, a fifth embodiment will be explained below. Since this fifth embodiment has basically the same structural arrangement as that of the second embodiment, the following will describe the fifth embodiment, partially using the foregoing explanation of the second embodiment.

The fifth embodiment, however, differs from the second embodiment in terms of the way of interaction between the router unit 25 and subscriber terminals, and also in terms of the process executed inside the router unit 25. FIG. 8 is a sequence diagram that specifically shows this difference from the second embodiment. Note that the fifth embodiment is distinguishable in that two additional steps S51 and S52 are inserted between the steps S13 and S14 of FIG. 5, while the remaining steps are common to both embodiments. Also note that FIG. 8 omits the details of steps S14 and later, and the following description will focus on the new steps S51 and S52.

[S51] Out of the data packet received in step S13, the router unit 25 extracts an IP address ipa and MAC address ma of the source subscriber terminal 12a, and examines whether they are registered in the first address table 26 or not. If no entry relevant to the above addresses is found in the first address table 26 (i.e., the source subscriber terminal 12a cannot be verified as a regular subscriber terminal), the router unit 25 discards the data packet addressed to the subscriber terminal 12b.

[S52] If there is found an entry for the above addresses registered in the first address table 26, the source subscriber terminal 12a is verified as a regular subscriber terminal, and the process thus advances to step S14.

In the way described above, the fifth embodiment enables the router unit 25 to assure that the source subscriber terminal is a regular member of the CATV network.

As a variant of this fifth embodiment, the above-described steps S51 and S52 can be inserted between S23 and S24 of FIG. 6 in the third embodiment. Furthermore, as another variant of the fifth embodiment, the above-described steps S51 and S52 can be inserted between S43 and S44 of FIG. 7 in the fourth embodiment.

Figure 9:
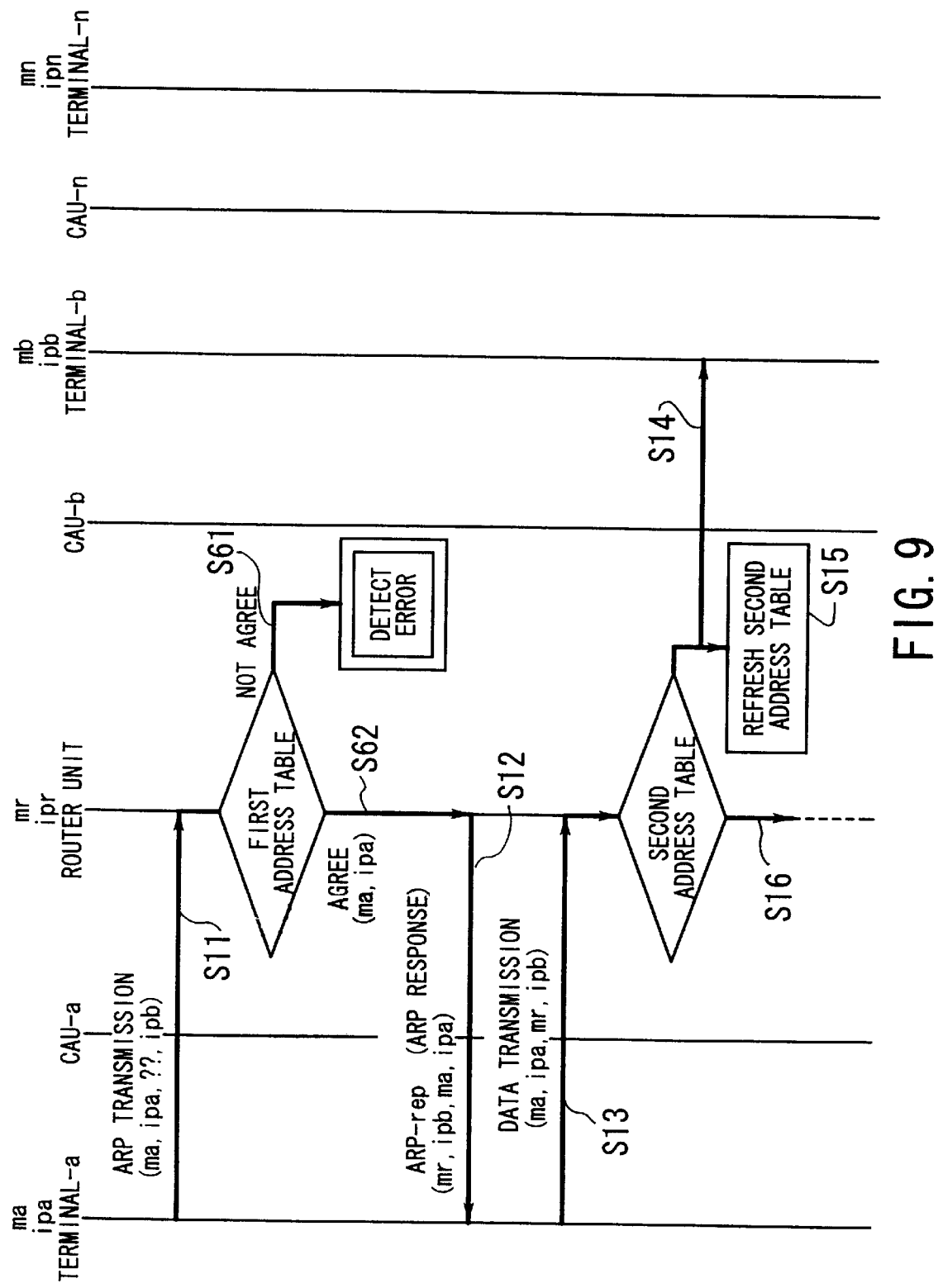
FIG. 9 is a sequence diagram for a sixth embodiment, which specifically shows data transmission and reception between a router unit and subscriber terminals, as well as explaining the operation of the router unit.

Referring next to FIG. 9, a sixth embodiment will be explained below. Since this sixth embodiment has basically the same structural arrangement as that of the second embodiment, the following will describe the sixth embodiment, partially using the foregoing explanation of the second embodiment.

The sixth embodiment, however, differs from the second embodiment in terms of the way of interaction between the router unit 25 and subscriber terminals, and also in terms of the process executed inside the router unit 25. FIG. 9 is a sequence diagram that specifically shows this difference from the second embodiment. Note that the sixth embodiment is distinguishable in that two additional steps S61 and S62 are inserted between the steps S11 and S12 of FIG. 5 in the second embodiment, while the remaining steps are common to both embodiments. Also note that FIG. 9 omits the details of steps S14 and later, and the following description focuses on the new steps S61 and S62.

[S61] The router unit 25 extracts an IP address ipa of the source subscriber terminal 12a out of the APR request packet, and examines whether it is registered in the first address table 26 or not. If no entry for the above address is found in the first address table 26 (i.e., the source subscriber terminal 12a cannot be verified as a regular subscriber terminal), the router unit 25 discards the ARP request packet.

[S62] If there is found an entry for the above addresses in the first address table 26, the source subscriber terminal 12a is verified as a regular subscriber terminal, and the process thus advances to step S12.

In the way described above, the six embodiment enables the router unit 25 to assure that the source subscriber terminal is a regular member of the network, as the fifth embodiment does.

As a variant of this sixth embodiment, the above-described steps S61 and S62 can be inserted between S21 and S22 of FIG. 6 in the third embodiment. As another variant of this sixth embodiment, the above-described steps S61 and S62 can be inserted between S41 and S42 of FIG. 7 in the fourth embodiment.

All the first through sixth embodiments of the present invention discussed above are configured under the assumption that the contents of the first address table 26 are entered beforehand by hand. Such registration of the first address table 26, however, can be performed by another method described below with reference to FIG. 10.

Figure 10:
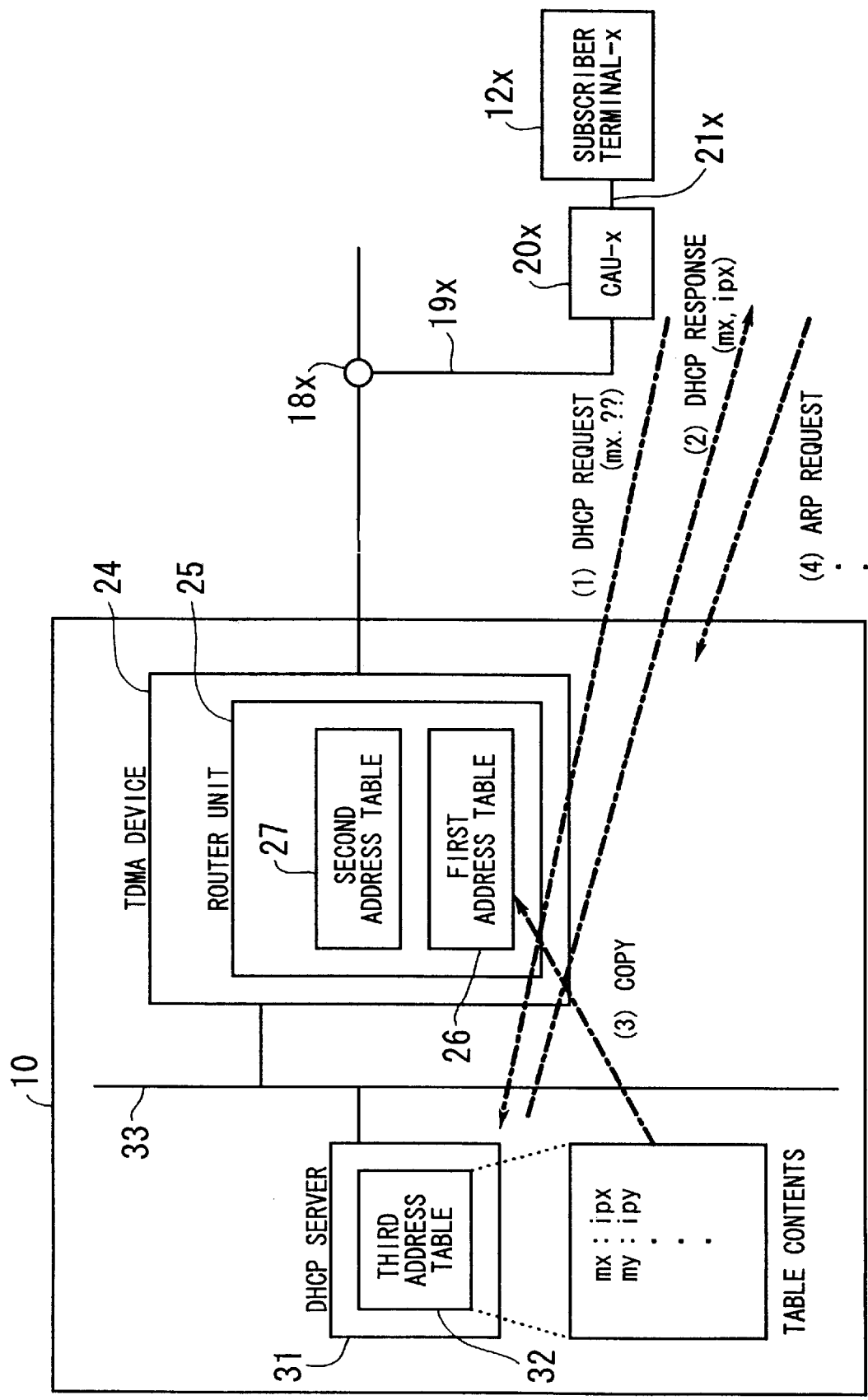
FIG. 10 is a diagram showing how an address table is generated in the case that a DHCP server is used.

FIG. 10 is a diagram showing how the address table is generated in the case that a DHCP server is used, wherein DHCP is an acronym of Dynamic Host Configuration Protocol. More specifically, a DHCP server 31, comprising a third address table 32, is connected to the TDMA device 24 via a bus 33 in order to automatically allocate IP addresses to subscriber terminals. It is assumed that a subscriber terminal 12x has a MAC address mx, but it has no IP address assigned.

When trying to initiate data communication, the subscriber terminal 12x first requests the DHCP server 31 to allocate an IP address thereto, while indicating its own MAC address mx (see the arrow (1) in FIG. 10) to the server. In response to this request, the DHCP server 31 assigns an IP address ipx corresponding to the MAC address mx and informs the subscriber terminal 12x of this address assignment. Further, the DHCP server 31 registers the newly defined combination of IP address ipx and MAC address mx to the third address table 32 (see the arrow (2) in FIG. 10). Subsequently, the contents of the third address table 32 are copied to the first address table 26 in the router unit 25 (see the arrow (3) in FIG. 10). The subscriber terminal 12x, having acquired its own IP address ipx, is now allowed to send an ARP request packet to the router unit 25 (see the arrow (4) in FIG. 10).

The above-described structural arrangement enables the first address table 26 to operate with a higher degree of reliability.

The above discussion is summarized as follows. According to the present invention, the address table stores logical addresses and physical addresses of individual subscriber terminals, where the association of two kinds of addresses is registered beforehand. When the central station receives transmission data and the logical address of a destination subscriber terminal, the physical address reading means disposed in the central station reads out a physical address corresponding to the received logical address by consulting the address table. When the received logical address exists in the address table, the data transfer means forwards the transmission data to the destination subscriber terminal, by using the physical address read out by the physical address reading means and the received logical address. When the received logical address was incorrect, the physical address reading means will not be able to find the corresponding entry in the address table. If that is the case, the received transmission data will be discarded. This allows the LAN system to continue its operation even if a wrong logical address is set to the subscriber terminal.

In the present invention, both logical address and physical address of a source subscriber terminal are sent to the central station together with transmission data. The router unit, as part of the central station, is configured so that it will discard the transmission data if it failed to find the logical and physical address pair of the source subscriber terminal in the address table.

This structural arrangement protects the system from malicious behavior of such a person who attempts to make access to the network resources by using some other person's IP address.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A LAN system including a central station and a plurality of subscriber terminals interconnected via a network, which provides data communication services between the plurality of subscriber terminals via the central station by using logical addresses and physical addresses assigned thereto, as well as analog information delivery services from the central station to the plurality of subscriber terminals, the plurality of subscriber terminals including a first subscriber terminal with a first logical address and a first physical address and a second subscriber terminal with a second logical address and a second physical address, the LAN system comprising:

a router unit, disposed in the central station, for receiving transmission data from the first subscriber terminal along with the second logical address affixed thereto as a destination logical address, and routing the transmission data to the second subscriber terminal;

an address table, disposed in said router unit, for storing the logical addresses assigned to the individual subscriber terminals and the physical addresses associated with the logical addresses;

physical address reading means, disposed in said router unit, for reading out the second physical address associated with the second logical address from said address table, upon receipt of the transmission data addressed to the second subscriber terminal;

data transfer means, disposed in said router unit, for forwarding the received transmission data to the second subscriber terminal by using the second logical address affixed to the received transmission data and the second physical address that is read out by said physical address reading means; and data discarding means, disposed in said router unit, for discarding the received transmission data if said physical address reading means is unable to obtain the second physical address because the second logical address is not registered in said address table.

2. The LAN system according to claim 1, wherein the central station is a central facility for CATV services and the analog information delivery services include delivery of video information and/or voice information.

3. The LAN system according to claim 1, wherein the logical addresses assigned to the subscriber terminals are Internet Protocol (IP) addresses.

4. The LAN system according to claim 1, wherein the physical addresses assigned to the subscriber terminals are Media Access Control (MAC) addresses.

5. A LAN system including a central station and a plurality of subscriber terminals interconnected via a network, which provides data communication services between the plurality of subscriber terminals via the central station by using logical addresses and physical addresses assigned thereto, as well as analog information delivery services from the central station to the plurality of subscriber terminals, the plurality of subscriber terminals including a first subscriber terminal with a first logical address and a first physical address and a second subscriber terminal with a second logical address and a second physical address, the LAN system comprising:

a router unit, disposed in the central station, for receiving transmission data from the first subscriber terminal along with the second logical address affixed thereto as a destination logical address, and routing the transmission data to the second subscriber terminal;

a first address table, disposed in said router unit, for storing the logical addresses assigned to the individual subscriber terminals and the physical addresses associated with the logical addresses;

a second address table, disposed in said router unit, for storing the logical addresses assigned to the individual subscriber terminals and the physical addresses associated with the logical addresses, said second address table having a function of deleting an entry thereof if the entry has not been refreshed within a predetermined time period;

first physical address reading means, disposed in said router unit, for reading out the second physical address associated with the second logical address affixed to the received transmission data, by searching said second address table, upon receipt of the transmission data addressed to the second subscriber terminal;

first data transfer means, disposed in said router unit, for forwarding the received transmission data to the second subscriber terminal by using the second logical address affixed to the received transmission data and the second physical address that is read out of the second address table by said first physical address reading means;

table refreshing means, disposed in said router unit and activated when said first physical address reading means has successfully read out the second physical address associated with the second logical address, for refreshing said second address table with the second logical address affixed to the received transmission data and the second physical address read out by said first physical address reading means;

second physical address reading means, disposed in said router unit, for reading out the second physical address associated with the second logical address affixed to the received transmission data, by searching said first address table, when said first physical address reading means has failed to read out the second physical address from the second address table because of absence of an entry for the second logical address;

second data transfer means, disposed in said router unit and activated when said second physical address reading means has successfully read out the second physical address associated with the second logical address, for forwarding the received transmission data to the second subscriber terminal by using the second logical address affixed to the received transmission data and the second physical address read out by said second physical address reading means;

table registration means, disposed in said router unit and activated when said second physical address reading means has successfully read out the second physical address associated with the second logical address, for registering the second logical address and the second physical address read out by said second physical address reading means to said second address table as a new entry; and data discarding means, disposed in said router unit, for discarding the received transmission data, if said second physical address reading means has failed to read out the second physical address from said first address table because of absence of an entry for the second logical address.

6. The LAN system according to claim 5, further comprising sender verification means, disposed in said router unit and activated when said router unit receives the transmission data from the first subscriber terminal along with the first logical address and the first physical address, for verifying that the received first logical address and the received first physical address are both registered in said first address table.

7. The LAN system according to claim 5, further comprising inquirer verification means, disposed in said router unit and activated when said router unit receives an inquiry from the first subscriber terminal, along with the first logical address and the first physical address, about a physical address associated with the second subscriber terminal, for verifying that the received first logical address and the received first physical address are both registered in said first address table.

8. A LAN system including a central station and a plurality of subscriber terminals interconnected via a network, which provides data communication services between the plurality of subscriber terminals via the central station by using logical addresses and physical addresses assigned thereto, as well as analog information delivery services from the central station to the plurality of subscriber terminals, the plurality of subscriber terminals including a first subscriber terminal with a first logical address and a first physical address and a second subscriber terminal with a second logical address and a second physical address, the LAN system comprising:

a router unit, disposed in the central station, for receiving transmission data from the first subscriber terminal along with the second logical address affixed thereto as a destination logical address, and routing the transmission data to the second subscriber terminal;

a first address table, disposed in said router unit, for storing the logical addresses assigned to the individual subscriber terminals and the physical addresses associated with the logical addresses;

a second address table, disposed in said router unit, for storing the logical addresses assigned to the individual subscriber terminals and the physical addresses associated with the logical addresses, said second address table having a function of erasing an entry thereof if the entry has not been refreshed within a predetermined time period;

first physical address reading means, disposed in said router unit, for reading out the second physical address associated with the second logical address affixed to the transmission data, by searching said second address table, upon receipt of the transmission data addressed to the second subscriber terminal;

first data transfer means, disposed in said router unit, for forwarding the received transmission data to the second subscriber terminal by using the second logical address affixed to the received transmission data and the second physical address that is read out of the second address table by said first physical address reading means;

table refreshing means, disposed in said router unit and activated when said first physical address reading means has successfully read out the second physical address associated with the second logical address, for refreshing said second address table with the second logical address affixed to the received transmission data and the second physical address read out by said first physical address reading means;

second physical address reading means, disposed in said router unit, for reading out the second physical address associated with the second logical address affixed to the received transmission data, by searching said first address table, when said first physical address reading means has failed to read out the second physical address from the second address table because of absence of an entry for the second logical address;

address inquiry means, disposed in said router unit and activated when said second physical address reading means has successfully read out the second physical address associated with the second logical address, for inquiring the second subscriber terminal having the second logical address about a physical address thereof;

verification means, disposed in said router unit, for receiving the physical address from the second subscriber terminal as a response to the inquiry made by said address inquiry means, and verifying that the received physical address and the second logical address both reside in said first address table as a registered entry;

second data transfer means, disposed in said router unit and activated when said verification means has successfully verified the registered entry, for forwarding the received transmission data to the second subscriber terminal by using the second logical address affixed to the received transmission data and the second physical address that is read out of the first address table by said second physical address reading means;

table registration means, disposed in said router unit and activated when said verification means has successfully verified the registered entry, for registering the second logical address affixed to the received transmission data and the second physical address read out by said second physical address reading means to said second address table as a new entry;

first data discarding means, disposed in said router unit, for discarding the received transmission data, if said second physical address reading means has failed to read out the second physical address from said first address table because of absence of an entry for the second logical address; and second data discarding means, disposed in said router unit, for discarding the received transmission data, if said verification means has failed to verify the registered entry.

9. The LAN system according to claim 8, further comprising second verification means, disposed in said router unit and activated when said router unit receives the transmission data from the first subscriber terminal along with the first logical address and the first physical address, for verifying that the received first logical address and the received first physical address are both registered in said first address table.

10. The LAN system according to claim 8, further comprising second verification means, disposed in said router unit and activated when said router unit receives an inquiry from the first subscriber terminal, along with the first logical address and the first physical address, about a physical address associated with the second subscriber terminal, for verifying that the received first logical address and the received first physical address are both registered in said first address table.

11. A LAN system including a central station and a plurality of subscriber terminals interconnected via a network, which provides data communication services between the plurality of subscriber terminals via the central station by using logical addresses and physical addresses assigned thereto, as well as analog information delivery services from the central station to the plurality of subscriber terminals, the plurality of subscriber terminals including a first subscriber terminal with a first logical address and a first physical address and a second subscriber terminal with a second logical address and a second physical address, the LAN system comprising:

a router unit, disposed in the central station, for receiving transmission data from the first subscriber terminal along with the second logical address affixed thereto as a destination logical address, and routing the transmission data to the second subscriber terminal;

a first address table, disposed in said router unit, for storing the logical addresses assigned to the individual subscriber terminals and the physical addresses associated with the logical addresses;

a second address table, disposed in said router unit, for storing the logical addresses assigned to the individual subscriber terminals and the physical addresses associated with the logical addresses, said second address table having a function of erasing an entry thereof if the entry has not been refreshed within a predetermined time period;

first physical address reading means, disposed in said router unit, for reading out the second physical address associated with the second logical address affixed to the transmission data, by searching said second address table, upon receipt of the transmission data addressed to the second subscriber terminal;

first data transfer means, disposed in said router unit, for forwarding the received transmission data to the second subscriber terminal by using the second logical address affixed to the received transmission data and the second physical address that is read out of the second address table by said first physical address reading means;

table refreshing means, disposed in said router unit and activated when said first physical address reading means has successfully read out the second physical address associated with the second logical address, for refreshing said second address table with the second logical address affixed to the received transmission data and the second physical address read out by said first physical address reading means;

reception means, disposed in said router unit and activated when said first physical address reading means has failed to read out the second physical address from said second address table because of absence of an entry for the second logical address, for inquiring all the subscriber terminals about a physical address associated with the second logical address, and waiting for a predetermined time period until a single response from the second subscriber terminal having the second logical address is received;

second data transfer means, disposed in said router unit and activated when said reception means has received the single response and if a physical address included in the single response and the second logical address are confirmed as both being registered in said first address table, for forwarding the received transmission data to the second subscriber terminal by using the second logical address affixed to the received transmission data and the physical address that is included in the response from the second subscriber terminal that is received by said reception means;

table registration means, disposed in said router unit and activated when said reception means has received the single response and if a physical address included in the single response and the second logical address are confirmed as both being registered in said first address table, for registering to said second address table the second logical address affixed to the received transmission data and the physical address that is included in the single response that said reception means has received from the second subscriber terminal; and data discarding means, disposed in said router unit, for discarding the received transmission data, when said reception means has received two or more responses from the subscriber terminals or when the physical address included in the single response and the second logical address are not registered in said first address table.

12. The LAN system according to claim 11, further comprising sender verification means, disposed in said router unit and activated when said router unit receives the transmission data from the first subscriber terminal along with the first logical address and the first physical address, for verifying that the received first logical address and the received first physical address are both registered in said first address table.

13. The LAN system according to claim 11, further comprising inquirer verification means, disposed in said router unit and activated when said router unit receives an inquiry from the first subscriber terminal, along with the first logical address and the first physical address, about a physical address associated with the second subscriber terminal, for verifying that the received first logical address and the received first physical address are both registered in said first address table.

* * * * *